United States Patent [19]

Audebert et al.

[11] Patent Number: 4,942,101
[45] Date of Patent: Jul. 17, 1990

[54] ELECTROCHEMICAL CELL HAVING AN ALKALINE ELECTROLYTE AND A ZINC NEGATIVE ELECTRODE

[75] Inventors: Jean F. Audebert, Val de Reuil; Daniel Mauchausseè, Amfreville la Campagne, both of France

[73] Assignees: CIPEL; WONDER, both of Levallois Perret, France

[21] Appl. No.: 380,063

[22] Filed: Jul. 14, 1989

[30] Foreign Application Priority Data

Jul. 25, 1988 [FR] France ............................... 88 10014

[51] Int. Cl.⁵ ............................................. H01M 2/26
[52] U.S. Cl. .................................... 429/165; 429/178; 429/211
[58] Field of Search ............... 429/164, 165, 166, 229, 429/230, 231, 133, 134, 178, 211

[56] References Cited

U.S. PATENT DOCUMENTS 3,442,716  5/1969  Muraki et al.

FOREIGN PATENT DOCUMENTS 57-147873  9/1982  Japan .
60-221957  11/1985  Japan .
62-5564  1/1987  Japan .
62-69463  3/1987  Japan .
1108170  4/1968  United Kingdom .
1241396  8/1971  United Kingdom .

Primary Examiner—Donald L. Walton
Attorney, Agent, or Firm—Sughrue, Mion, Zinn, Macpeak & Seas

[57] ABSTRACT

An electrochemical cell having an alkaline electrolyte and a gelled negative electrode containing zinc powder free from mercury, from cadmium, and from lead, and having 1 ppm to 1000 ppm of an organic stabilization compound selected from: polyfluoride compounds of the ethoxyl fluoroalcohol type; and compounds of the polyethoxyl alcohol and alcoyl sulfide type. The electrode is provided with a nail-shaped cylindrical negative current collector immersed in the gell and passing through a sealing plug and connected to the negative terminal. The current collector is constituted, at least superficially, by a substance selected from: pure zinc, pure cadmium, indium, and gallium; and the nail includes means assembled thereon without melting metal and serving to increase its developed surface area.

8 Claims, 4 Drawing Sheets

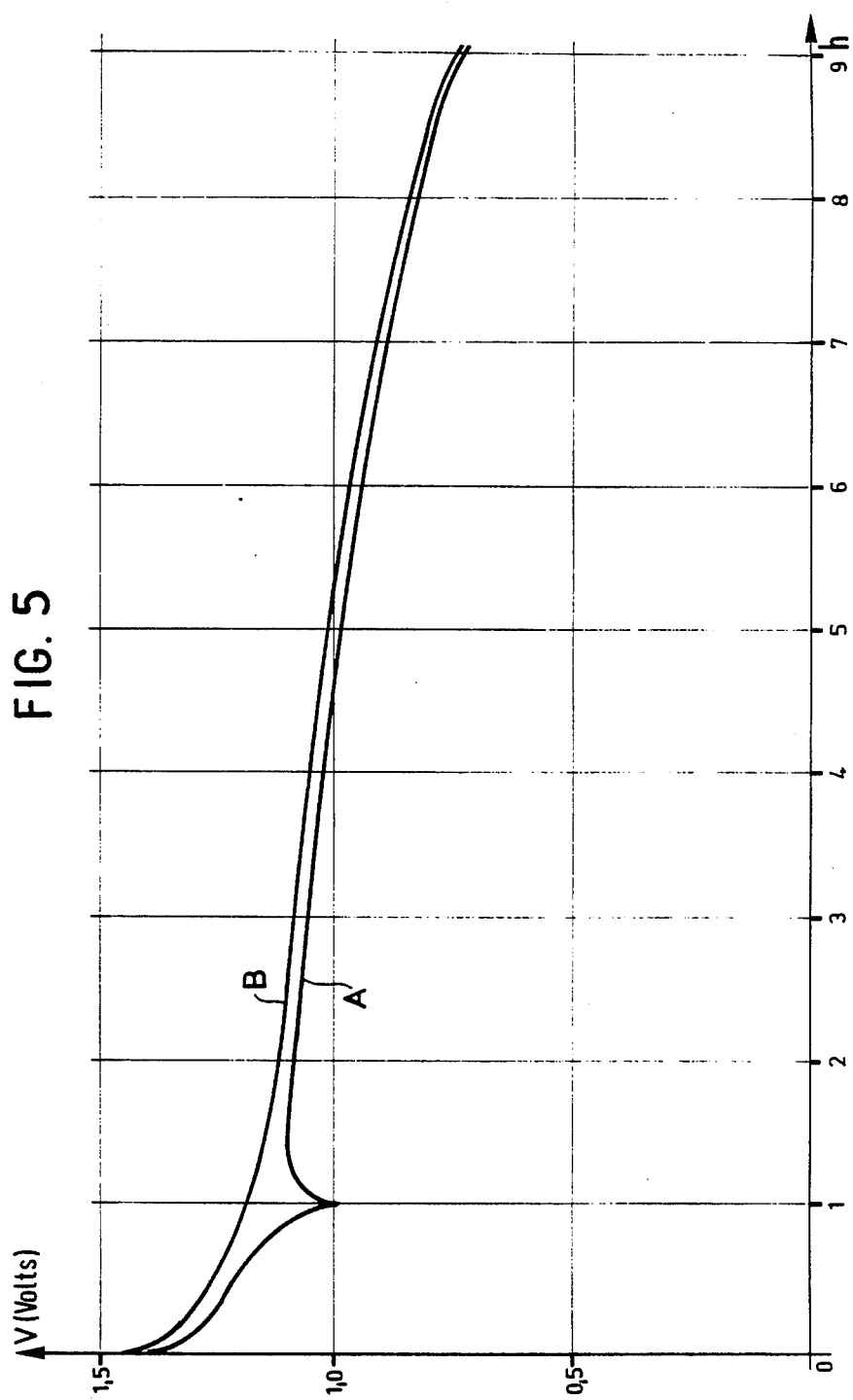

ELECTROCHEMICAL CELL HAVING AN ALKALINE ELECTROLYTE AND A ZINC NEGATIVE ELECTRODE

The present invention relates to electrochemical cells having an alkaline electrolyte and a zinc negative electrode, and in particular alkaline primary cells of the zinc/maganese dioxide, zinc/silver oxide, or zinc/air type in which the negative electrode is corrodable by the alkaline solution.

BACKGROUND OF THE INVENTION

Although such primary cells or "batteries" enable high energies to be obtained, because their reactive negative electrodes are corrodable in the alkaline electrolyte, they have relatively low stability which gives rise to a loss of battery capacity during storage because some of the anode is dissolved in the electrolyte. There also occurs continuous and considerable evolution of gaseous hydrogen causing electrolyte to be ejected, and sometimes giving rise to gas pressures that burst the battery's safety valve. These harmful phenomena occur more vigorously with increasing temperature, e.g. during storage in a hot country.

In order to avoid these phenomena, all battery manufacturers have for years been amalgamating their zinc electrodes, and sometimes also adding cadmium and lead thereto. Mercury and lead are simple and effective means for lowering the overvoltage at which hydrogen is given off, or in other words for avoiding corrosion of the zinc, with cadmium having the additional role of improving conduction. The zinc electrode is thus constituted by a mixture of amalgamated zinc powder containing lead and cadmium powder, and a concentrated potassium hydroxide alkaline solution, which mixture is gelled. A current collector constituted by a metal cylinder in the form of a "nail" is plunged into the electrode.

Even though these elements of mercury, cadmium, and lead are present in small quantities in each battery, there is abundant and worrying literature relating to the dangers of dispersing these substances in the environment and to the very severe risk of them finding their way into the food chain. Two things can happen to a battery after it has been thrown away by a customer. Batteries either accumulate in tips or landfills, in which case the can of the battery protects its contents for a certain length of time, after which it corrodes and the active substances including mercury are leached by surface water. Otherwise, batteries are processed in incinerators in which the mercury distills and is spread into the atmosphere with the smoke, prior to recondensing roundabout. In either event, mercury finds its way into the environment.

It is sometimes recommended that used batteries containing mercury, cadmium, or lead should be recovered, however this does not appear to be an ideal solution since it leads to a waste concentration which is even more dangerous to look after.

Therefore, looking beyond regulations which currently require the concentration of such metals in batteries to be reduced, it is essential to find ways of eliminating them completely. However, a low mercury content of less than 3% by weight relative to the zinc is already insufficient on its own for battery conservation, and various replacement solutions have already been attempted.

The most effective solutions have been proposed by the present Assignee. Thus in French patent FR-A-2 567 328, the present Assignee describes a method of stabilizing a zinc electrode by incorporating 0.01% to 1% by weight relative to the zinc of a polyfluoride organic compound of the ethoxyl fluoroalcohol type. The Assignee has also proposed, in French patent FR-A-2 583 580, another compound of the polyethoxyl alcohol and alkyl type at a concentration of 0.001% to 1% by weight. In both of these two prior cases, it has been observed that although the problem of zinc corrosion is resolved, the voltage level of the battery is reduced, and the reduction in voltage level increases with increasing current demand, i.e. the higher the current the greater the voltage drop.

SUMMARY OF THE INVENTION

The present invention provides an electrochemical cell having an alkaline electrolyte and a gelled negative electrode containing zinc powder free from mercury, from cadmium, and from lead, and having 1 ppm to 1000 ppm of an organic stabilization compound selected from: polyfluoride compounds of the ethoxyl fluoroalcohol type; and compounds of the polyethoxyl alcohol and alkyl sulfide type; said electrode being provided with a nail-shaped cylindrical negative current collector immersed in the gell and passing through a sealing plug and connected to the negative terminal, wherein said current collector is constituted, at least superficially, by a substance selected from: pure zinc, pure cadmium, indium, and gallium; and wherein said nail includes means assembled thereon without melting metal and serving to increase its developed surface area.

In a first embodiment, said nail is provided with an Ω-section fin snapped onto said nail.

In a second embodiment, said nail is provided with a plurality of "hinge" type parts fitted successively thereon, lengthwise.

In a third embodiment, said nail is provided with an n-turn spring fitted thereover.

In a fourth embodiment, said spring is fixed to said sealing plug.

In all cases, there are no spots where assembly is performed by melting metal, which spots would otherwise constitute points on the negative electrode which are sensitive to spontaneous corrosion.

In addition, the parts which are assembled are very easily fabricated individually.

The current collector may be made from a substance chosen from: brass; pure copper; pure zinc; and cadmium.

In an extremely advantageous improvement giving excellent results during very severe discharging, the gell in which the current collector is immersed contains metal fibers of the same nature as the current collector, said fibers having a length lying in the range 1 mm to 10 mm, a diameter lying in the range 0.01 mm and 0.5 mm, and a quantity lying in the range 0.5% to 10%. Preferably, the diameter of the fibers lies in the range 0.05 mm to 0.1 mm, and the quantity of the fibers lies in the range 2% to 5% by weight relative to the zinc.

BRIEF DESCRIPTION OF THE DRAWINGS

Embodiments of the invention are described by way of example with reference to the accompanying drawings, in which:

FIG. 5 is a graph showing the discharge curve of a prior art battery A and of a battery B including a current collector of the invention, the discharge was performed through a resistance of 5 ohms, and the curves are plotted showing volts (V) as a function of time (h) in hours;

DETAILED DESCRIPTION

Figure 1A:
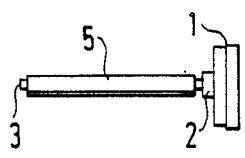
FIG. 1A is a longitudinal elevation view of a first embodiment of a current collector in accordance with the invention.

In FIGS. 1A to 4B, the same reference numerals are used for identical items. These figures show an insulating plug 1 having a barrel 2 for situating at the top end of the negative electrode of a battery. The negative current collector passes therethrough, plunging into the negative electrode gell and connected, after going through the plug 1, to the negative terminal. The current collector is in the form of a nail 3 associated with means for increasing its developed surface area.

Figure 1B:
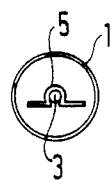
FIG. 1B is an end view in elevation of the same current collector.

In FIGS. 1A and 1B, the nail 3 has an $\Omega$-section fin 5 snapped thereon.

Figure 2A:
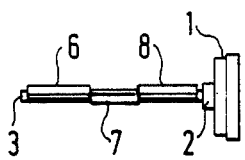
FIGS. 2B-2B, 3A-3B, and 4A-4B are pairs of views analogous to FIGS. 1A to 1B, showing other embodiments.
Figure 2B:
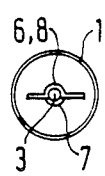

In FIGS. 2A and 2B, three hinge-shaped elements 6, 7, and 8 are fitted onto the nail 3 at different orientations.

Figure 3A:
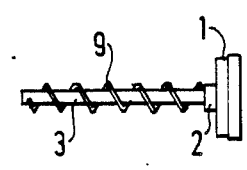
Figure 3B:
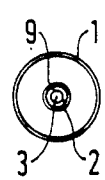

In FIGS. 3A and 3B, an n-turn spring 9 is fitted onto the nail 3.

Figure 4A:
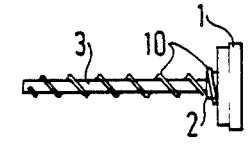
Figure 4B:

In FIGS. 4A and 4B, the spring 10 acts as a clamping ring fitted both onto the nail 3 and onto the barrel 2 of the plug 1.

All of the above current collectors are based on brass, pure copper, pure zinc, or cadmium. They are coated with a layer of substance selected from: pure zinc; pure cadmium; indium; and gallium.

A prior art battery including a negative electrode was made as follows.

The zinc powder was prepared without mercury, without cadmium, and without lead, and 50 ppm of a polyfluoride stabilization compound of the ethoxy fluoroalcohol type, such as $C_6F_{13}C_2H_4(C_2H_4O)_{14}OH$ was added thereto. Concentrated potassium hydroxide alkaline solution was added and the mixture was gelled by means of a gelling agent of the carboxymethyl-cellulose type. This gave rise to a very viscous paste which was put into place in a housing provided for this purpose in a battery. A negative current collector constituted by a metal cylinder in the form of a nail 3 was plunged into the paste. Curve A of FIG. 5 is the discharge curve obtained when an R6-sized battery made as described above was discharged under severe conditions, i.e. through a resistance of 5 ohms. This curve shows defects such as a general drop in voltage level, and also a large drop in voltage after one hour. This sudden drop may be spontaneous or it may be provoked by the shocks to which the battery is subjected during discharge.

When batteries were made in which the nail 3 of battery A was replaced by one of the current collectors shown in FIGS. 1A to 4B, discharge curve B was obtained which is entirely satisfactory for such discharge conditions.

Figure 6:
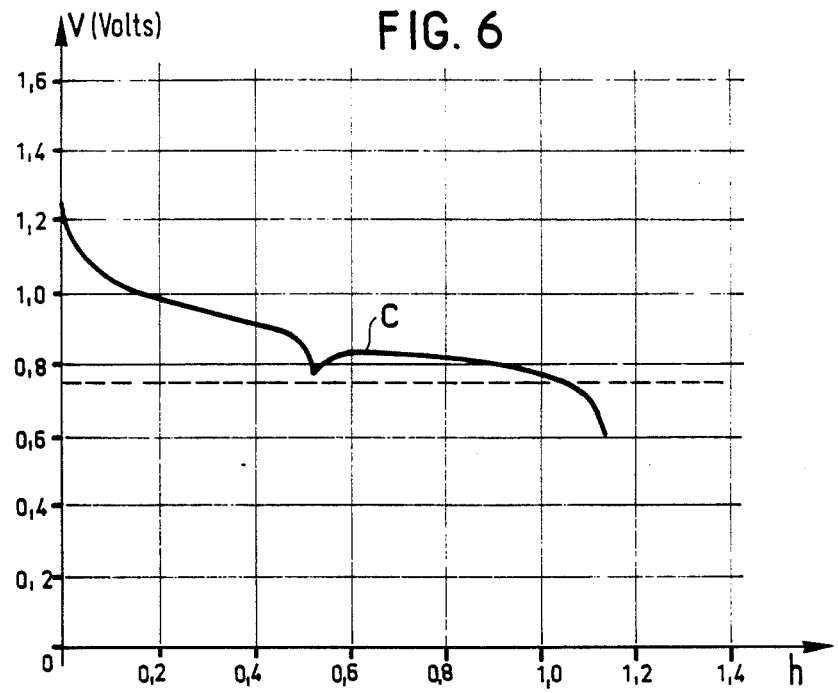
FIG. 6 shows curve C corresponding to battery A being discharged through 1 ohm.
Figure 7:
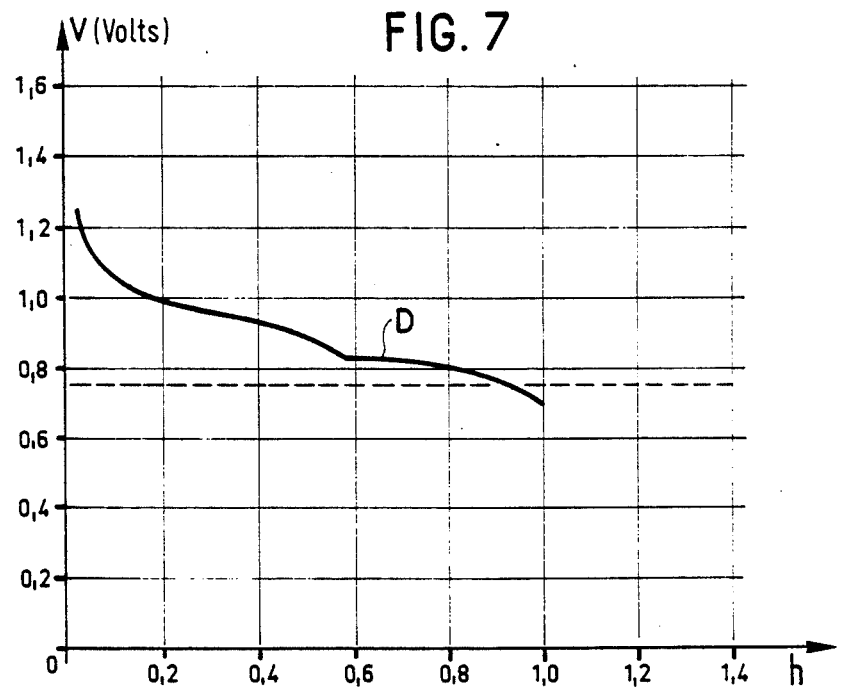
FIG. 7 shows curve D corresponding to a battery having a current collector of the invention being discharged through 1 ohm.

However, when battery A and a battery of the invention were discharged under even more severe conditions (continuously through a resistance of 1 ohm), curves C and D respectively were obtained as shown in FIGS. 6 and 7. A small dip can still be seen in curve D after about 0.6 hours.

In order to further optimize the results obtained under very severe discharge conditions, tests were performed in which 0.2% by weight relative to the zinc of indium-covered copper fibers were added to the gelled mixture of battery A and of a battery of the invention. The fibers were 5 mm long and 0.1 mm in diameter.

Figure 8:
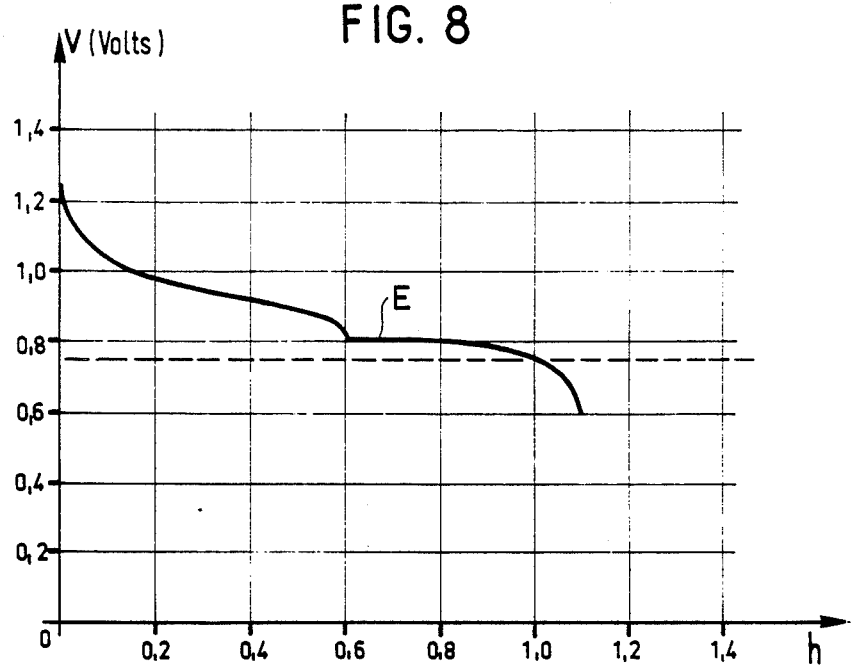
FIG. 8 shows curve E corresponding to battery A being discharged through 1 ohm, said battery being additionally provided with conducting fibers in its gell.
Figure 9:
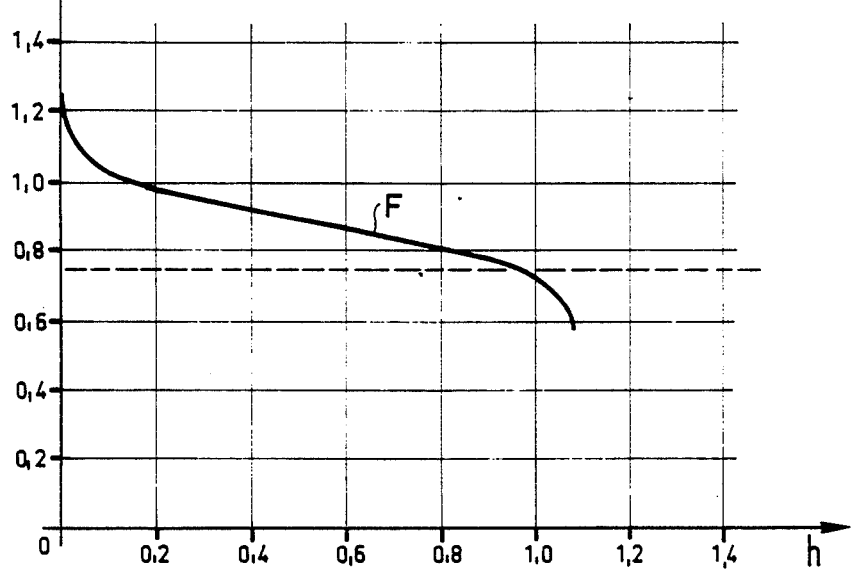
FIG. 9 shows curve F corresponding to the battery of FIG. 7 being discharged through 1 ohm, said battery being additionally provided with conducting fibers in its gell.

Modified battery A gave curve E when discharging through 1 ohm, and irregularities can still be seen in this curve (see FIG. 8), whereas the battery of the invention gave discharge curve F (see FIG. 9) which is highly satisfactory.

Naturally the invention is not limited to the embodiments described and shown. The invention can be applied to any alkaline battery having a negative electrode made of zinc which does not contain any mercury, cadmium, or lead. The fibers should be made of substances analogous to those used for the current collector. Any means can be replaced by equivalent means without going beyond the scope of the invention.

We claim:

1. An electrochemical cell having an alkaline electrolyte and a gelled negative electrode containing zinc powder free from mercury, from cadmium, and from lead, and having 1 ppm to 1000 ppm of an organic stabilization compound selected from: polyfluoride compounds of the ethoxyl fluoroalcohol type; and compounds of the polyethoxyl alcohol and alkyl sulfide type; said electrode being provided with a nail-shaped cylindrical negative current collector immersed in the gell and passing through a sealing plug and connected to the negative terminal, wherein said current collector is constituted, at least superficially, by a substance selected from: pure zinc, pure cadmium, indium, and gallium; and wherein said nail includes means assembled thereon without melting metal and serving to increase its developed surface area.

2. An eletrochemical cell according to claim 1, wherein said nail is provided with an $\Omega$-section fin snapped onto said nail.

3. An electrochemical cell according to claim 1, wherein said nail is provided with a plurality of "hinge" type parts fitted successively thereon, lengthwise.

4. An electrochemical cell according to claim 1, wherein said nail is provided with an n-turn spring fitted thereover.

5. An electrochemical cell according to claim 4, wherein said spring is fixed to said sealing plug.

6. An electrochemical cell according to claim 1, wherein said current collector is based on a material selected from: brass; pure copper; pure zinc; and cadmium.

7. An electrochemical cell according to claim 1, wherein the gell in which the current collector is immersed contains metal fibers of the same nature as the current collector, said fibers having a length lying in the range 1 mm to 10 mm, a diameter lying in the range 0.01 mm and 0.5 mm, and a quantity lying in the range 0.5% to 10%.

8. An electrochemical cell according to claim 7, wherein the diameter of the fibers lies in the range 0.05 mm to 0.1 mm, and the quantity of the fibers lies in the range 2% to 5% by weight relative to the zinc.

* * * * *